(12) United States Patent
Dong et al.

(10) Patent No.: US 10,831,514 B2
(45) Date of Patent: Nov. 10, 2020

(54) DISPLAY METHOD AND DEVICE OF APPLICATION INTERFACE

(71) Applicant: Beijing Xiaomi Mobile Software Co., Ltd., Beijing (CN)

(72) Inventors: Hongguang Dong, Beijing (CN); Shun Chen, Beijing (CN); Liang Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 25 days.

(21) Appl. No.: 16/006,628

(22) Filed: Jun. 12, 2018

(65) Prior Publication Data

US 2018/0365038 A1    Dec. 20, 2018

(30) Foreign Application Priority Data

Jun. 14, 2017    (CN) .......................... 2017 1 0448467

(51) Int. Cl.
*G06F 9/451* (2018.01)
*G06F 8/61* (2018.01)

(52) U.S. Cl.
CPC ................ *G06F 9/451* (2018.02); *G06F 8/61* (2013.01)

(58) Field of Classification Search
CPC ................................... G06F 9/451; G06F 8/61
See application file for complete search history.

(56) References Cited

U.S. PATENT DOCUMENTS 6,418,554 B1 * 7/2002 Delo ......................... G06F 8/61
                                                           717/174
6,744,450 B1 * 6/2004 Zimniewicz .............. G06F 8/61
                                                           717/174
(Continued)

FOREIGN PATENT DOCUMENTS

CN        102968321 A      3/2013
CN        105528232 A      4/2016
(Continued)

OTHER PUBLICATIONS

Almeida et al., "A Framework for Testing Peer-to-Peer Systems", 2008, IEEE (Year: 2008).*

(Continued)

*Primary Examiner* — Wei Y Zhen
*Assistant Examiner* — Junchun Wu
(74) *Attorney, Agent, or Firm* — Oblon, McClelland, Maier & Neustadt, L.L.P.

(57) ABSTRACT

The present disclosure relates a method and device for displaying an application interface. The method includes determining a need to display any application interface in a target application; obtaining an identifier of N install sub-packages in an application install package of the target application based on the need, the N install sub-packages being install sub-packages required for displaying the application interface; wherein the target application is an uninstalled application, the application install package of the target application comprises a plurality of install sub-packages, and each of the plurality of install sub-packages is used for realizing a partial function of the target application, the N being greater than or equal to 1 and less than or equal to a sum of the plurality of install sub-packages; obtaining the N install sub-packages based on the identifier of the N install sub-packages; running the N install sub-packages to display (Continued)

the application interface; and displaying the application interface.

17 Claims, 5 Drawing Sheets

(56) References Cited

U.S. PATENT DOCUMENTS

| | | | | |
|---|---|---|---|---|
| 8,850,422 | B2* | 9/2014 | Chang | G06F 8/62 717/174 |
| 8,924,957 | B1* | 12/2014 | Newstadt | G06F 8/60 717/178 |
| 10,445,083 | B2* | 10/2019 | Kirkpatrick | G06F 8/61 |
| 2007/0106984 | A1* | 5/2007 | Birk Olsen | G06F 8/61 717/174 |
| 2011/0093845 | A1* | 4/2011 | Kwak | G06F 8/60 717/173 |
| 2011/0126191 | A1* | 5/2011 | Hughes | G06F 40/10 717/178 |
| 2013/0047149 | A1* | 2/2013 | Xu | G06F 21/53 717/175 |
| 2015/0007165 | A1* | 1/2015 | Zhao | G06F 8/61 717/174 |
| 2016/0323693 | A1* | 11/2016 | Rathod | G06Q 30/0243 |
| 2017/0161047 | A1* | 6/2017 | Jeon | G06F 8/61 |
| 2017/0206071 | A1* | 7/2017 | Kirkpatrick | G06F 8/61 |
| 2018/0373544 | A1* | 12/2018 | Deng | G06F 16/16 |

FOREIGN PATENT DOCUMENTS

| | | | | |
|---|---|---|---|---|
| KR | 20170067094 A | * | 6/2017 | G06F 8/61 |
| WO | WO-2013086988 A1 | * | 6/2013 | G06F 8/656 |
| WO | WO-2018076328 A1 | * | 5/2018 | G06F 3/04847 |

OTHER PUBLICATIONS

Gomes et al., "A Tool for Management and Reuse of Software Design Knowledge", 2006, Springer-Verlag Berlin Heidelberg, pp. 381-388 (Year: 2006).*

Weil, "Building Systems from Parts in the Real World", 1999, IFIP International Federation for Information Processing (Year: 1999).*

Mithun, "Linux package dependency visualization", 2011, Eindhoven University of Technology (Year: 2011).*

Combined Chinese Office Action and Search Report dated Dec. 10, 2019 in Chinese Patent Application No. 201710448467.6, 13 pages.

Chinese Office Action dated Jul. 31, 2020 in counterpart Chinese Appln. No. 201710448467.6, (7 pages).

* cited by examiner

DISPLAY METHOD AND DEVICE OF APPLICATION INTERFACE

CROSS-REFERENCE TO RELATED APPLICATIONS

This application is based upon and claims priority to Chinese Patent Application No. 201710448467.6, filed on Jun. 14, 2017, the entire contents of which are incorporated herein by reference.

TECHNICAL FIELD

The present disclosure relates to the field of terminal technology and more particularly in to a display method and device of an application interface.

BACKGROUND

With rapid development of terminal technologies, current terminals may install a variety of applications, and may provide diversified services to a user by the installed applications. For instance, the user may use applications installed by the terminal to listen to music, watch videos, play games, chat with friends, or the like. In actual practice, as there is usually a need for the user to use an application by means of an application interface, the terminal is required to display the application interface.

In related arts, if the terminal is intended to display an application interface of a certain application, there is a need for the user to first download an application install package of the application through the terminal. After downloading the application install package, the terminal is further required to install the application by running the application install package. After installation of the application is accomplished, the terminal is able to display the application interface of the application according to the user's operation.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of displaying an application interface. The method includes determining a need to display any application interface in a target application; obtaining an identifier of N install sub-packages in an application install package of the target application based on the need, the N install sub-packages being install sub-packages required for displaying the application interface; wherein the target application is an uninstalled application, the application install package of the target application comprises a plurality of install sub-packages, and each of the plurality of install sub-packages is used for realizing a partial function of the target application, the N being greater than or equal to 1 and less than or equal to a sum of the plurality of install sub-packages; obtaining the N install sub-packages based on the identifier of the N install sub-packages; running the N install sub-packages to display the application interface; and displaying the application interface.

According to an aspect, when obtaining the N install sub-packages based on the identifier of the N install sub-packages, the method includes downloading the N install sub-packages based on the identifier of the N install sub-packages.

According to another aspect, when obtaining the N install sub-packages based on the identifier of the N install sub-packages, the method includes, when it is determined that locally cached install sub-packages include the N install sub-packages based on the identifier of the N install sub-packages, obtaining the N install sub-packages from the cached install sub-packages.

According to an aspect, when running the N install sub-packages, the method includes running the N install sub-packages in a process of running the target application.

According to another aspect, when running the N install sub-packages, the method includes creating a process for running the target application; and running the N install sub-packages in the created process.

According to yet another aspect, when running the N install sub-packages, the method includes selecting a process from a cached process; and running the N install sub-packages in the selected process, the cached process being obtained by caching a process of an application that has completed running.

According to an aspect, when obtaining the identifier of the N install sub-packages in the application install package of the target application, the method includes, when a display instruction is received based on an identifier of the application interface that is currently displayed, determining a need to display the application interface, and obtaining the identifier of the N install sub-packages based on the identifier of the application interface.

According to an aspect, after displaying the application interface, the method includes determining a need to start any function in the application interface based on the application interface; obtaining an identifier of M install sub-packages in the plurality of install sub-packages based on the need; wherein the M install sub-packages are install sub-packages required for starting the function among the plurality of install sub-packages, the M being greater than or equal to 1 and less than or equal to the sum of the plurality of install sub-packages; obtaining the M install sub-packages based on the identifier of the M install sub-packages according to a manner of obtaining the N install sub-packages based on the identifier of the N install sub-packages; and running the M install sub-packages according to a manner of running the N install sub-packages to start the function.

Aspects of the disclosure also provide a device for displaying an application interface. The device includes a processor and a memory for storing instructions executable by the processor. The processor is configured to determine a need to display any application interface in a target application; obtain an identifier of N install sub-packages in an application install package of the target application based on the need, the N install sub-packages being install sub-packages required for displaying the application interface; wherein the target application is an uninstalled application, the application install package of the target application comprises a plurality of install sub-packages, and each of the plurality of install sub-packages is used for realizing a partial function of the target application, the N being greater than or equal to 1 and less than or equal to a sum of the plurality of install sub-packages; obtain the N install sub-packages based on the identifier of the N install sub-packages; run the N install sub-packages to display the application interface; and display the application interface.

Aspects of the disclosure also provide a non-transitory computer-readable storage medium storing instructions that, when being executed by one or more processors of a terminal, cause the terminal to determine a need to display any application interface in a target application; obtain an identifier of N install sub-packages in an application install package of the target application based on the need, the N install sub-packages being install sub-packages required for displaying the application interface; wherein the target application is an uninstalled application, the application install package of the target application comprises a plurality of install sub-packages, and each of the plurality of install sub-packages is used for realizing partial function of the target application, the N being greater than or equal to 1 and less than or equal to a sum of the plurality of install sub-packages; obtain the N install sub-packages based on the identifier of the N install sub-packages; run the N install sub-packages to display the application interface; and display the application interface.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

Figure 1:
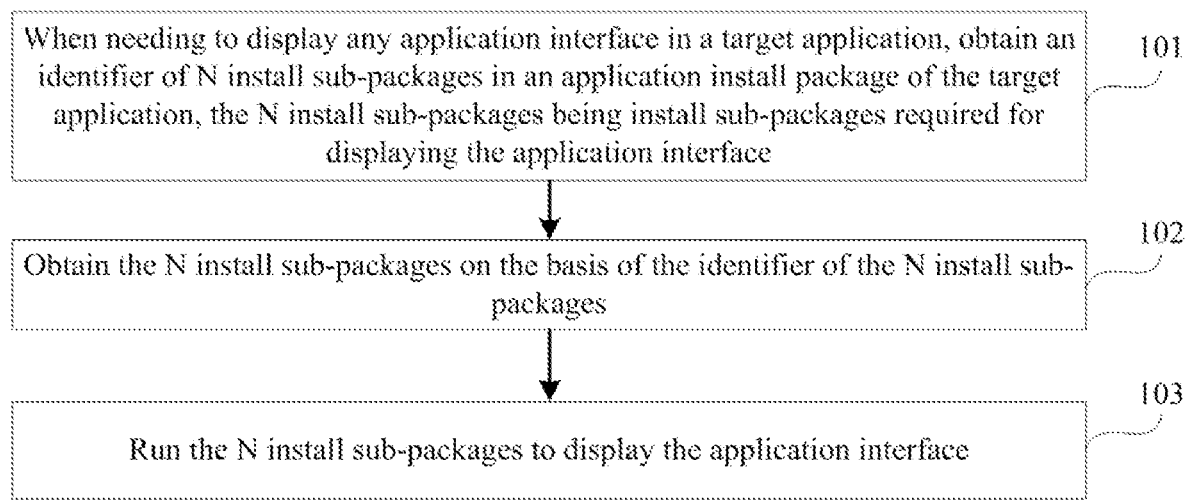
FIG. 1 illustrates a flow chart of a display method of an application interface according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Before detailed explanations of the aspects of the present disclosure, explanations are first made to application scenarios of the aspects of the present disclosure.

The aspects of the present disclosure are applied to scenarios in which an uninstalled target application is used. In related arts, when a user intends to use such uninstalled target application, there is generally a need to initiatively download an application install package of the target application by the user from an application store or an official website, then perform an initiative installation on the basis of the downloaded application install package, and after the installation of the target application is completed, the user is able to use the target application, i.e., the terminal is able to display an application interface of the application according to the user's operation. By such manner, it is required to download and install the whole application install package of the target application in advance, thus downloading and installation time is long, and a display efficiency of the application interface is low.

In the aspects of the present disclosure, on the premise of not installing or not installing and not downloading the target application, when needing to use an application interface of the target application, the user may acquire and run part of install sub-packages for displaying the application interface in the application install package of the target application so as to display the application interface, thereby saving the downloading and installation time of the target application, and improving the display efficiency of the application interface.

In actual application, the scenarios of using an application interface of a target application by a user may include such scenarios that the user triggers an identifier of the target application or triggers an identifier of a certain application interface of the target application in a display interface of a terminal. The display interface of the terminal may be a desktop, a web page, a document or the like. The identifier of the target application may be an icon, a link address, a name or the like of the target application. The identifier of a certain application interface of the target application may be an icon, a link address, a title or the like of the application interface. For example, the terminal may display an icon of a target application in a certain web page. After a user clicks on the icon of the target application, the terminal may jump to any application interface of the target application for use by the user. For another example, the terminal may display a title of a certain application interface of the target application in a certain web page. After the user clicks on the title of the application interface, the terminal may jump to the application interface of the target application.

FIG. 1 illustrates a flow chart of a display method of an application interface according to an exemplary aspect. The method is applied in a terminal. As shown in FIG. 1, the method includes the following steps.

In step 101, when it is needed to display any application interface of a target application, an identifier of N install sub-packages in an application install package of the target application is obtained, the N install sub-packages being install sub-packages required for displaying the application interface.

The target application is an uninstalled application, and the application install package of the target application includes a plurality of install sub-packages, each of which is used for realizing partial function of the target application, the N being greater than or equal to 1 and less than or equal to a sum of the plurality of install sub-packages.

In step 102, the N install sub-packages are obtained on the basis of the identifier of the N install sub-packages.

In step 103, the N install sub-packages are run to display the application interface.

In the aspects of the present disclosure, when it is necessary to display any application interface of an uninstalled target application, it is only needed to obtain N install sub-packages required for displaying the application interface from a plurality of install sub-packages included in the application install package of the target application, and then run such N install sub-packages, and thus the application interface may be displayed, wherein the N is greater than or equal to 1 and less than or equal to a sum of the plurality of install sub-packages. Accordingly, it is possible to display an application interface of an uninstalled application without obtaining and running the whole application install package of the uninstalled application in advance, thus saving the obtaining and installation time of the application install package, and improving the display efficiency of the application interface.

Alternatively, the obtaining the N install sub-packages on the basis of the identifier of the N install sub-packages, includes:

downloading the N install sub-packages on the basis of the identifier of the N install sub-packages; or, when determining that install sub-packages which are locally cached include the N install sub-packages on the basis of the identifier of the N install sub-packages, obtaining the N install sub-packages from the cached install sub-packages.

Alternatively, the running the N install sub-packages, includes:

running the N install sub-packages in a process of running the target application; or, creating a process for running the target application, and running the N install sub-packages in the created process; or, selecting a process from a cached process, and running the N install sub-packages in the selected process, the cached process being obtained by caching a process of an application which has completed running.

Alternatively, the obtaining the identifier of the N install sub-packages in the application install package of the target application when it is needed to display any application interface of the target application, includes:

when a display instruction is received on the basis of an identifier of the application interface that is currently displayed, determining that it is needed to display the application interface, and obtaining the identifier of the N install sub-packages on the basis of the identifier of the application interface.

Alternatively, after displaying the application interface, the method further includes:

obtaining an identifier of M install sub-packages among the plurality of install sub-packages, when it is determined that there is a need to start any function in the application interface on the basis of the application interface;

wherein, the M install sub-packages are install sub-packages required for starting the function among the plurality of install sub-packages, the M being greater than or equal to 1 and less than or equal to the sum of the plurality of install sub-packages;

obtaining the M install sub-packages on the basis of the identifier of the M install sub-packages, according to a manner of obtaining the N install sub-packages on the basis of the identifier of the N install sub-packages; and running the M install sub-packages according to a manner of running the N install sub-packages, to start the function.

All the aforementioned alternative technical solutions may form alternative aspects of the present disclosure according to any combination, and which will no longer be repeated by the aspects of the present disclosure.

Figure 2:
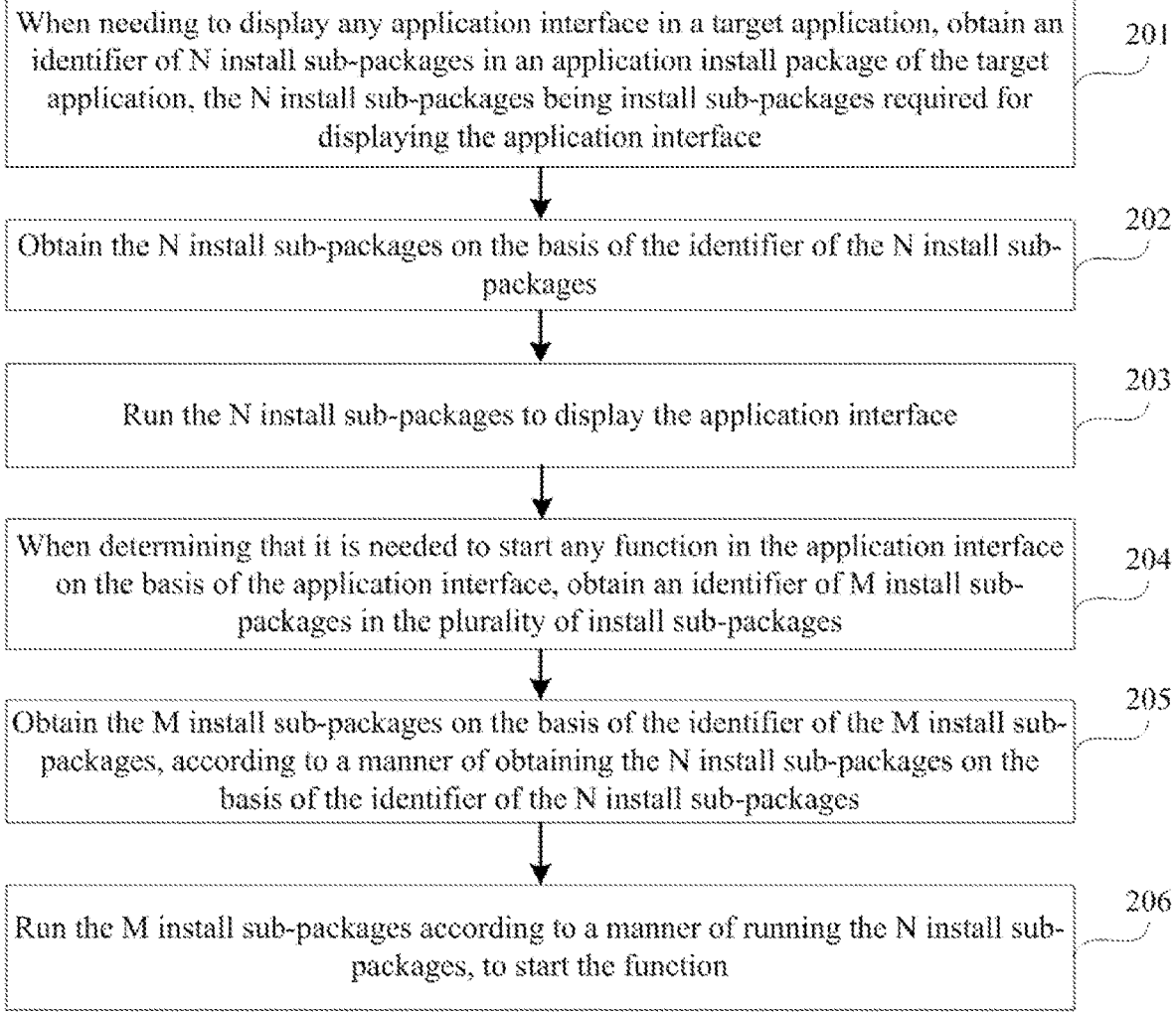
FIG. 2 illustrates a flow chart of a display method of an application interface according to another exemplary aspect of the present disclosure.

FIG. 2 is a flow chart of a display method of an application interface according to another exemplary aspect. The method is applied in a terminal. As shown in FIG. 2, the method includes the following steps.

In step 201, when it is needed to display any application interface in a target application, an identifier of N install sub-packages is obtained in an application install package of the target application, the N install sub-packages being install sub-packages required for displaying the application interface.

The target application is an uninstalled application, and the application install package of the target application includes a plurality of install sub-packages. Each of the install sub-packages is used for realizing partial function of the target application. The N is greater than or equal to 1 and less than or equal to a sum of the plurality of install sub-packages.

In the aspects of the present disclosure, in order to save the obtaining and installation time of an application install package, the application install package of a target application may be split into a plurality of install sub-packages according to a preset strategy in advance, each of which is used for realizing partial function of the target application. For example, splitting may be performed according to an application interface, such that each of the install sub-packages is used for displaying one or more application interfaces of the target application, or a plurality of install sub-packages are used for displaying one application interface of the target application. Alternatively, splitting is performed according to functions, such that each of the install sub-packages is used for realizing one or more functions of the target application, or a plurality of install sub-packages are used for realizing one function, and one of the functions may be a function of displaying the application interface of the target application. Thus, subsequently, when a terminal user needs to display any user interface of the target application, there is only a need to obtain N install sub-packages for displaying the application interface in the plurality of install sub-packages.

The obtaining the identifier of the N install sub-packages in the application install package of the target application when it is needed to display any application interface in the target application may include the following two implementation manners.

In a first implementation manner, when a triggering instruction on an identifier of the target application which is currently displayed is received, it is determined that it is needed to display any application interface of the target application, and an identifier of the N install sub-packages is obtained on the basis of the identifier of the target application.

The interface of the identifier of the target application which is currently displayed may be a desktop, a web page, a document, or the like. The identifier of the target application may be an icon, a name, a link address or the like of the target application. The identifier of N install sub-packages may be a name or an ID (Identification, identification number) of the N install sub-packages.

The triggering instruction is used for triggering any application interface of the target application. Said any application interface may be a home page or other application interfaces of the target application, which is not limited by the aspects of the present disclosure. Moreover, the triggering instruction may be triggered by a user by means of a designated operation. The designated operation may be a clicking operation, a double clicking operation, a sliding operation or the like on the identifier of the target application.

The identifier of the target application may correspond to an identifier of N install sub-packages for displaying any application interface of the target application, and the identifier of the corresponding N install sub-packages may be obtained on the basis of the identifier of the target application. For instance, the identifier of the target application may be an icon of the target application, and the icon corresponds to a link address of a certain application interface of the target application, such link address carrying an identifier of N install sub-packages for displaying the application interface. Thus, when a triggering instruction on the application icon is received, an identifier of the N install sub-packages may be obtained from a corresponding link address. Further, the N install sub-packages may be downloaded according to the link address and the identifier of the N install packages. The link address may be a URL (Uniform Resource Locator) and the like.

In a second implementation manner, when a display instruction is received on the basis of an identifier of any application interface of the target application that is currently displayed, it is determined to need to display the application interface, and an identifier of the N install sub-packages is obtained on the basis of the identifier of the application interface.

The currently displayed interface may be a desktop, a web page, a document, an application interface of the target application, or the like. The identifier of any application interface of the target application may be an icon, a link address, a title or the like of the application interface. The identifier of N install sub-packages may be a name, an ID or the like of the N install sub-packages, and the display instruction may also be triggered by a designated operation of a user.

The identifier of the application interface may correspond to an identifier of N install sub-packages for displaying the application interface, and an identifier of the corresponding N install sub-packages may be obtained on the basis of the identifier of the target application. For instance, the identifier of the application interface may be a link address of the application interface, and the link address carries an identifier of N install sub-packages for displaying the application interface. Thus, the identifier of N install sub-packages in the corresponding link address may be obtained on the basis of the identifier of the application interface. Further, the N install sub-packages may be downloaded according to the link address and the identifier of the N install sub-packages. The link address may be a URL and the like.

Taking the target application as news application for example, the terminal may display a news headline in a web page, and the news headline is a link address which carries an identifier of N install sub-packages for displaying a detail interface of the news headline in the target application. Thus, the identifier of the N install sub-packages may be obtained on the basis of the news headline.

In step 202, the N install sub-packages are obtained on the basis of the identifier of the N install sub-packages.

The obtaining the N install sub-packages on the basis of the identifier of the N install sub-packages includes the following several implementation manners.

In a first implementation manner, the N install sub-packages are downloaded on the basis of the identifier of the N install sub-packages.

The terminal may directly download the N install sub-packages from network after obtaining the identifier of the N install sub-packages, or the terminal may first determine whether locally cached install sub-packages include the N install sub-packages on the basis of the identifier of the N install sub-packages after obtaining the identifier of the N install sub-packages, and if the locally cached install sub-packages do not include the N install sub-packages, the terminal downloads the N install sub-packages from network.

The locally cached install sub-packages are obtained by caching the install sub-packages that have been downloaded. In other words, the aspects of the present disclosure further provide a function of caching the install sub-packages that have been downloaded. For a plurality of install sub-packages included in the application install package of the target application, when any of the install sub-packages is downloaded, the terminal may cache the install sub-package to a local cache. For example, a folder for caching the install sub-package of the target application may be created in the local cache. When any of the install sub-packages is downloaded, the install sub-package that has been downloaded may be cached in the folder.

In a second implementation manner, when the install sub-packages locally cached are determined to include the N install sub-packages on the basis of the identifier of the N install sub-packages, the N install sub-packages are obtained from the cached install sub-packages.

In other words, after obtaining the identifier of the N install sub-packages, it is determined whether the locally cached install sub-packages include the N install sub-packages on the basis of the identifier of the N install sub-packages, and when the locally cached install sub-packages include the N install sub-packages, the N install sub-packages may be directly obtained from the local cache, without downloading from network.

By caching the install sub-packages that have been downloaded, when needing to use the install sub-packages next time, the install sub-packages may be obtained directly from the cache, which avoids a repeated downloading of the install sub-packages, and thus saves the downloading time.

For a target application that has not been started, when it is needed to obtain install sub-packages of the target application, it is also possible not to determine whether there is cached with the install sub-packages, but to directly download the install sub-packages from network.

In step 203, the N install sub-packages are run to display the application interface.

By running the N install sub-packages, a corresponding function of the N install sub-packages may be installed, and the application interface may be displayed. After displaying the application interface of the target application, a user may conveniently use the target application on the application interface. Accordingly, in the aspects of the present disclosure, the user can use the target application without a need to download and install the whole install package of the target application, thereby saving the downloading and installation time of the application, and improving the operation efficiency of the user.

The running the N install sub-packages may include the following several implementation manners.

In a first implementation manner, a process for running the target application is created, and the N install sub-packages are run in the created process.

An application is required to run in a corresponding process. When a certain application is started, there is generally a need to create a process for running the application in a process pool, and then run the application in the created process. Correspondingly, when the target application has not been started, after obtaining N install sub-packages of the target application, it is also necessary to first create a process for running the target application, and then the N install sub-packages may be run in the process of the target application.

The terminal may directly create a process for running the target application when N install sub-packages of the target application are obtained and the target application has not been started, and run the N install sub-packages in the created process, or, the terminal may determine whether a cached process exists in the process pool when the N install sub-packages are obtained and the target application has not been started, and when no cached process exists in the process pool, the terminal creates a process for running the target application, and then runs the N install sub-packages in the created process.

The cached process is obtained by caching a process of an application which has been concluded in running. In other words, the aspects of the present disclosure further provide a mechanism for caching a process. After any application is started and a process for running the application is created in the process pool, if the application is closed such as to terminate running, the terminal may cache the process in the process pool, such that when other applications are started subsequently, the terminal may directly utilize the cached process to run other applications without a need to re-create a new process, thereby improving a starting efficiency of the application.

Further, a process pool generally only maintains a preset number of processes at the same time. When a certain application is started, if the process pool is currently present with a preset number of processes, and all the preset number of processes are running the applications, in order to run the currently started application, the terminal may close the earliest created process in the preset number of processes, and then create a new process for running the currently started application.

The preset number may be set as default by a terminal, and may also be set by a user, which is not limited by the aspects of the present disclosure.

In a second implementation manner, a process is selected from cached processes, and the N install sub-packages are run in the selected process.

In other words, when the N install sub-packages are obtained and the target application has not been started, the terminal may first determine whether a cached process is existing in the process pool, and when the cached process is existing in the process pool, the terminal may select a process from the caching process, and then run the N install sub-packages in the selected process, without a need to separately creating a process for running the target application, so as to improve the starting efficiency of the target application.

In a third implementation manner, the N install sub-packages are run in a process of running the target application.

The terminal may run the N install sub-packages in a process of running the target application when the N install sub-packages are obtained and the target application has been started. When the target application has been started, it means that the current process pool is already present with a process for running the target application. Accordingly, the terminal may directly run the N install sub-packages in the process of running the target application, so as to display the application interface.

It should be explained that, when the target application is started for the first time, the aspects of the present disclosure may display an application interface of the target application for use by a user by means of the aforementioned method, so as to rapidly start the target application and improve the starting efficiency, and in the process of using the target application by a user, the aspects of the present disclosure may also determine a need to display a relevant second application interface on the basis of the currently displayed first application interface, and jump from the currently displayed first application interface to the second application interface for use by a user, so as to ensure consecutive use of the target application by the user. Also in other words, for an uninstalled target application, the terminal may download and install it whilst using the same by way of the method of the aspects of the present disclosure.

In step 204, when determining there is a need to start any function of the application interface on the basis of the application interface, an identifier of M install sub-packages in the plurality of install sub-packages is obtained.

The M install sub-packages are install sub-packages required for starting the function in the plurality of install sub-packages, the M being greater than or equal to 1 and less than or equal to a sum of the plurality of install sub-packages. In actual application, the function may be a collection function, a commenting function, a setting function or other functions of the application interface.

The terminal may determine that there is a need to start any function in the application interface when a triggering operation on any function access in the application interface is received on the basis of the application interface. Then, the terminal may obtain an identifier of M install sub-packages for realizing this function on the basis of the function access. For instance, the function access may correspond to a link address for realizing the function, the link address carrying an identifier of the M install sub-packages.

In step 205, the M install sub-packages are obtained on the basis of the identifier of the M install sub-packages, according to a manner of obtaining the N install sub-packages on the basis of the identifier of the N install sub-packages.

In step 206, the M install sub-packages are run according to a manner of running the N install sub-packages, to start the function.

The step 205 may refer to the relevant descriptions of the aforementioned step 202, and the step 206 may refer to the relevant descriptions of the step 203. Thus, repetition will no longer be made in the aspects of the present disclosure here.

It should be explained that, the aspects of the present disclosure are only explained by exemplifying that the M install sub-packages for displaying the application interface cannot realize the relevant function in the target application interface. However, in actual application, the M install sub-packages for displaying the application interface may also be used for realizing the function in the application interface. Also in other words, when it is needed to start any function in the application interface, it is also possible to not implement the aforementioned steps 104-106, but to directly realize the relevant function of the application interface on the basis of the obtained M install sub-packages, which is not limited by the aspects of the present disclosure.

In the aspects of the present disclosure, when it is needed to display any application interface of an uninstalled target application, there is only a need to obtain N install sub-packages required for displaying the application interface from a plurality of install sub-packages included in the application install package of the target application, and then run such N install sub-packages, thereby the application interface may be displayed, wherein the N is greater than or equal to 1 and less than or equal to a sum of the plurality of install sub-packages. Accordingly, it is possible to effectuate displaying an application interface without a need to obtain and run the whole application install package of an uninstalled application in advance, thus saving the obtaining and installation time of the application install package, and improving the display efficiency of the application interface.

Figure 3A:
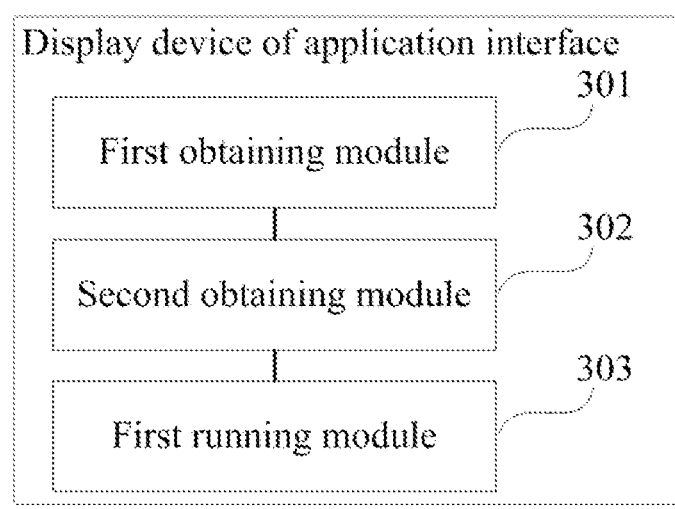
FIG. 3A is a block diagram of a display device of an application interface according to an exemplary aspect of the present disclosure.

FIG. 3A is a block diagram of a display device of an application interface according to an exemplary aspect. With reference to FIG. 3A, the device includes: a first obtaining module 301, a second obtaining module 302, and a first running module 303.

The first obtaining module 301 is configured to, when needing to display any application interface in the target application, obtain an identifier of N install sub-packages in an application install package of a target application, the N install sub-packages being install sub-packages required for displaying the application interface.

The target application is an uninstalled application, and the application install package of the target application includes a plurality of install sub-packages, each of which is used for realizing partial function of the target application, the N being greater than or equal to 1 and less than or equal to a sum of the plurality of install sub-packages.

The second obtaining module 302 is configured to obtain the N install sub-packages on the basis of the identifier of the N install sub-packages.

The first running module 303 configured to run the N install sub-packages, to display the application interface.

Alternatively, the second obtaining module 302 is used for:

downloading the N install sub-packages on the basis of the identifier of the N install sub-packages; or, when it is determined that locally cached install sub-packages include the N install sub-packages on the basis of the identifier of the N install sub-packages, obtaining the N install sub-packages from the cached install sub-packages.

Alternatively, the first running module 303 is used for:

running the N install sub-packages in a process of running the target application; or, creating a process for running the target application, and running the N install sub-packages in the created process; or, selecting a process from cached processes, and running the N install sub-packages in the selected process, the cached processes being obtained by caching a process of an application which has been concluded in running.

Alternatively, the first obtaining module 301 is used for:

when a display instruction is received on the basis of an identifier of the application interface that is currently displayed, determining that there is a need to display the application interface, and obtaining an identifier of the N install sub-packages on the basis of the identifier of the application interface.

Figure 3B:
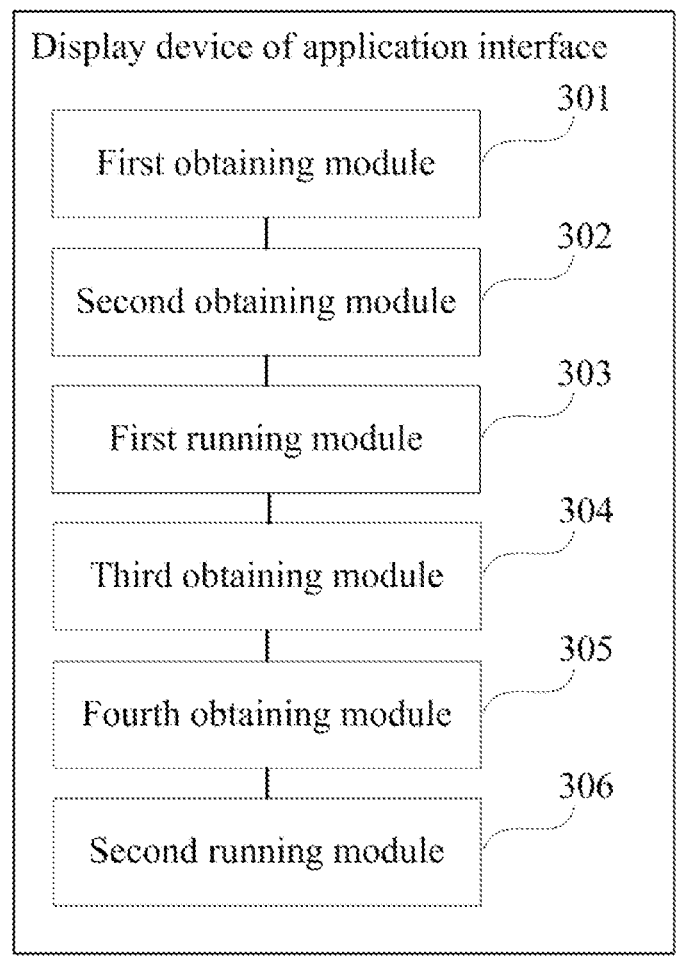
FIG. 3B is a block diagram of a display device of an application interface according to another exemplary aspect of the present disclosure.

Alternatively, with reference to FIG. 3B, the device further includes: a third obtaining module 304, a fourth obtaining module 305, and a second running module 306.

The third obtaining module 304 is configured to, when it is determined that there is a need to start any function in the application interface on the basis of the application interface, obtain an identifier of M install sub-packages in the plurality of install sub-packages.

The M install sub-packages are install sub-packages required for starting the function in the plurality of install sub-packages, the M being greater than or equal to 1 and less than or equal to a sum of the plurality of install sub-packages.

The fourth obtaining module 305 is configured to obtain the M install sub-packages on the basis of the identifier of the M install sub-packages, according to a manner of obtaining the N install sub-packages on the basis of the identifier of the N install sub-packages.

The second running module 306 is configured to run the M install sub-packages, to apply the function according to a manner of running the N install sub-packages.

In the aspects of the present disclosure, when it is necessary to display any application interface of an uninstalled target application, there is only a need to obtain N install sub-packages required for displaying the application interface from a plurality of install sub-packages included in the application install package of the target application, and then run such N install sub-packages, thereby the application interface may be displayed, and the N is greater than or equal to 1 and less than or equal to a sum of the plurality of install sub-packages. Accordingly, it is possible to effectuate displaying an application interface without a need to obtain and run the whole application install package of an uninstalled application in advance, thus saving the obtaining and installation time of the application install package, and improving the display efficiency of the application interface.

With respect to the devices in the above aspects, the specific manners for performing operations for individual modules therein have been described in detail in the aspects regarding the methods, which will not be elaborated herein.

Figure 4:
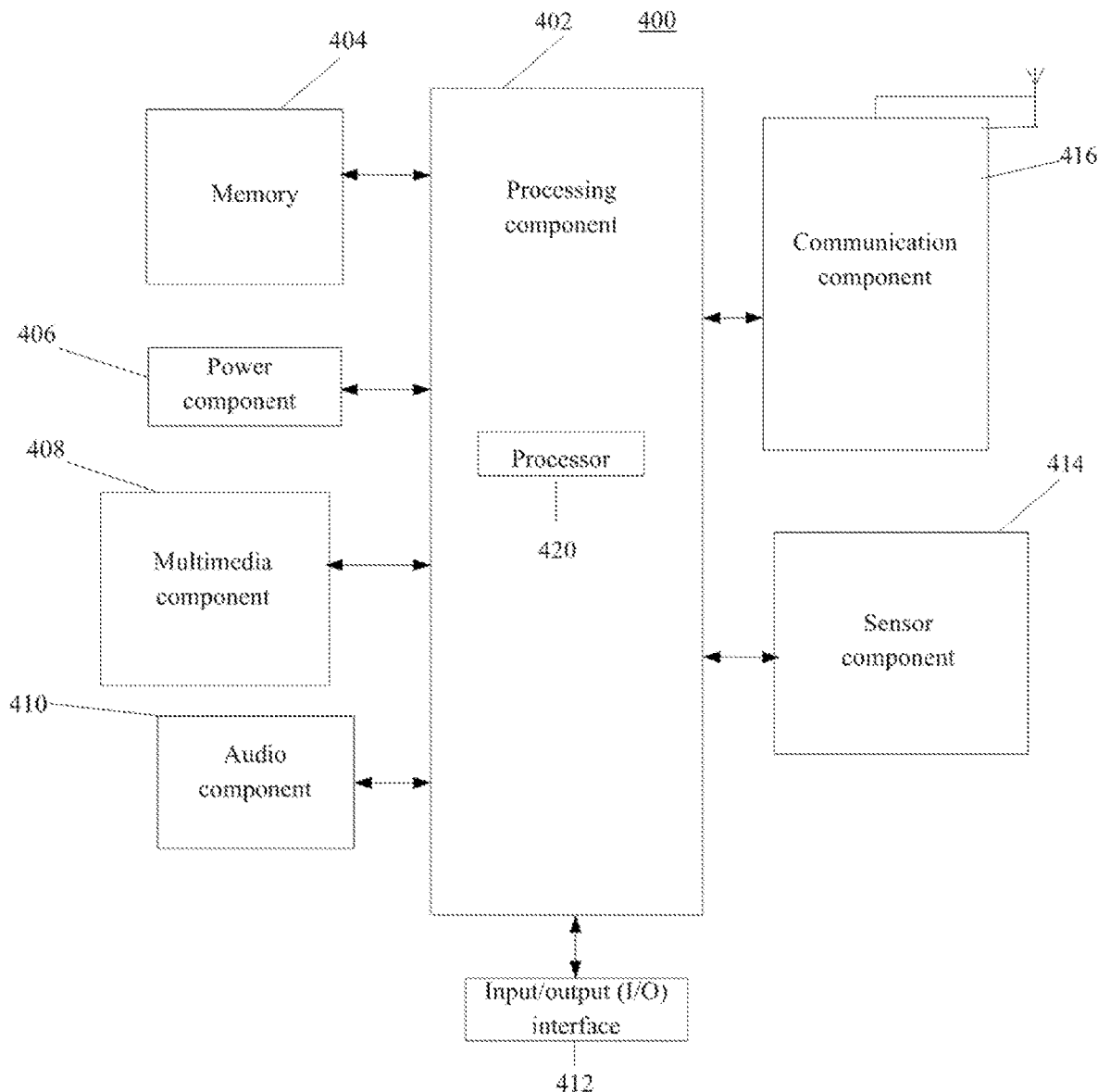
FIG. 4 is a block diagram of a display device 400 of an application interface according to an exemplary aspect of the present disclosure.

FIG. 4 is a block diagram of a display device 400 of an application interface according to an exemplary aspect. For example, the device 400 may be a mobile phone, a computer, a digital broadcast terminal, a messaging device, a gaming console, a tablet, a medical device, exercise equipment, a personal digital assistant, and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 408 includes a front camera and/or a rear camera. The front camera and/or the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some aspects, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some aspects, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G; or 3G or a combination thereof. In one exemplary aspect, the communication component 416 receives a broadcast signal or broadcast associated information from an external broadcast management system via a broadcast channel. In one exemplary aspect, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the display methods of the application interface provided by the above described aspects shown in FIG. 1 and/or FIG. 2.

In exemplary aspects, there is also provided a non-transitory computer readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

There is a non-transitory computer-readable storage medium, when instructions in the storage medium are executable by one or more processors of a terminal, the terminal is enabled to perform the display methods of the application interface provided by the above described aspects shown in FIG. 1 and/or FIG. 2.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure should only be limited by the appended claims.

What is claimed is:

1. A method of displaying an application interface, comprising:
   determining a need to display any application interface in a target application;
   when an identifier of the target application or an identifier of any application interface of the target application in a display interface of a terminal is triggered, obtaining an identifier of N install sub-packages in an application install package of the target application based on the need, the N install sub-packages being install sub-packages required for displaying the application interface,
   wherein the target application is an uninstalled application, the application install package of the target application comprises a plurality of install sub-packages, and each of the plurality of install sub-packages is used for realizing a partial function of the target application, the N being greater than or equal to 1 and less than or equal to a sum of the plurality of install sub-packages, and wherein the application install package of the target application is split into the plurality of install sub-packages based on the application interface such that (i) each of the plurality of install sub-packages is used for displaying one or more application interfaces of the target application, or (ii) the plurality of install sub-packages are used for displaying one application interface of the target application;

obtaining the N install sub-packages based on the identifier of the N install sub-packages;

running the N install sub-packages to display the application interface; and displaying the application interface.

2. The method according to claim 1, wherein obtaining the N install sub-packages based on the identifier of the N install sub-packages comprises:

downloading the N install sub-packages based on the identifier of the N install sub-packages.

3. The method according to claim 1, wherein obtaining the N install sub-packages based on the identifier of the N install sub-packages comprises:

when it is determined that locally cached install sub-packages include the N install sub-packages based on the identifier of the N install sub-packages, obtaining the N install sub-packages from the cached install sub-packages.

4. The method according to claim 1, wherein running the N install sub-packages comprises:

running the N install sub-packages in a process of running the target application.

5. The method according to claim 1, wherein running the N install sub-packages comprises:

creating a process for running the target application; and
running the N install sub-packages in the created process.

6. The method according to claim 1, wherein running the N install sub-packages comprises:

selecting a process from a cached process; and
running the N install sub-packages in the selected process, the cached process being obtained by caching a process of an application that has completed running.

7. The method according to claim 1, wherein obtaining the identifier of the N install sub-packages in the application install package of the target application comprises:

when a display instruction is received based on an identifier of the application interface that is currently displayed, determining a need to display the application interface, and obtaining the identifier of the N install sub-packages based on the identifier of the application interface.

8. The method according to claim 1, wherein after displaying the application interface, the method further comprises:

determining a need to start any function in the application interface based on the application interface;

obtaining an identifier of M install sub-packages in the plurality of install sub-packages based on the need;

wherein the M install sub-packages are install sub-packages required for starting the function among the plurality of install sub-packages, the M being greater than or equal to 1 and less than or equal to the sum of the plurality of install sub-packages;

obtaining the M install sub-packages based on the identifier of the M install sub-packages according to a manner of obtaining the N install sub-packages based on the identifier of the N install sub-packages; and running the M install sub-packages according to a manner of running the N install sub-packages to start the function.

9. A device for displaying an application interface, comprising:

a processor; and
a memory for storing instructions executable by the processor, wherein the processor is configured to:
determine a need to display any application interface in a target application;

when an identifier of the target application or an identifier of any application interface of the target application in a display interface of a terminal is triggered, obtain an identifier of N install sub-packages in an application install package of the target application based on the need, the N install sub-packages being install sub-packages required for displaying the application interface, wherein the target application is an uninstalled application, the application install package of the target application comprises a plurality of install sub-packages, and each of the plurality of install sub-packages is used for realizing a partial function of the target application, the N being greater than or equal to 1 and less than or equal to a sum of the plurality of install sub-packages, and wherein the application install package of the target application is split into the plurality of install sub-packages based on the application interface such that (i) each of the plurality of install sub-packages is used for displaying one or more application interfaces of the target application, or (ii) the plurality of install sub-packages are used for displaying one application interface of the target application;

obtain the N install sub-packages based on the identifier of the N install sub-packages;

run the N install sub-packages to display the application interface; and display the application interface.

10. The device according to claim 9, wherein the processor is further configured to:

download the N install sub-packages based on the identifier of the N install sub-packages.

11. The device according to claim 9, wherein the processor is further configured to:

when it is determined that locally cached install sub-packages include the N install sub-packages based on the identifier of the N install sub-packages, obtain the N install sub-packages from the cached install sub-packages.

12. The device according to claim 9, wherein the processor is further configured to:

run the N install sub-packages in a process of running the target application.

13. The device according to claim 9, wherein the processor is further configured to:

create a process for running the target application; and
run the N install sub-packages in the created process.

14. The device according to claim 9, wherein the processor is further configured to:

select a process from a cached process; and
run the N install sub-packages in the selected process, the cached process being obtained by caching a process of an application that has completed running.

15. The device according to claim 9, wherein the processor is further configured to:
when a display instruction is received based on an identifier of the application interface that is currently displayed, determine a need to display the application interface, and obtain the identifier of the N install sub-packages based on the identifier of the application interface.

16. The device according to claim 9, wherein the processor is further configured to:
determine a need to start any function in the application interface based on the application interface;
obtain an identifier of M install sub-packages in the plurality of install sub-packages based on the need;
wherein the M install sub-packages are install sub-packages required for starting the function among the plurality of install sub-packages, the M being greater than or equal to 1 and less than or equal to the sum of the plurality of install sub-packages;
obtain the M install sub-packages based on the identifier of the M install sub-packages according to a manner of obtaining the N install sub-packages based on the identifier of the N install sub-packages; and
run the M install sub-packages according to a manner of running the N install sub-packages, to start the function.

17. A non-transitory computer-readable storage medium storing instructions that, when being executed by one or more processors of a terminal, cause the terminal to:
determine a need to display any application interface in a target application;
when an identifier of the target application or an identifier of any application interface of the target application in a display interface of a terminal is triggered, obtain an identifier of N install sub-packages in an application install package of the target application based on the need, the N install sub-packages being install sub-packages required for displaying the application interface,
wherein the target application is an uninstalled application, the application install package of the target application comprises a plurality of install sub-packages, and each of the plurality of install sub-packages is used for realizing partial function of the target application, the N being greater than or equal to 1 and less than or equal to a sum of the plurality of install sub-packages, and
wherein the application install package of the target application is split into the plurality of install sub-packages based on the application interface such that (i) each of the plurality of install sub-packages is used for displaying one or more application interfaces of the target application, or (ii) the plurality of install sub-packages are used for displaying one application interface of the target application;
obtain the N install sub-packages based on the identifier of the N install sub-packages;
run the N install sub-packages to display the application interface; and
display the application interface.

* * * * *